Jan. 2, 1951 T. B. KELLY, JR 2,536,373
EXTRACTION COLUMN
Filed July 23, 1949
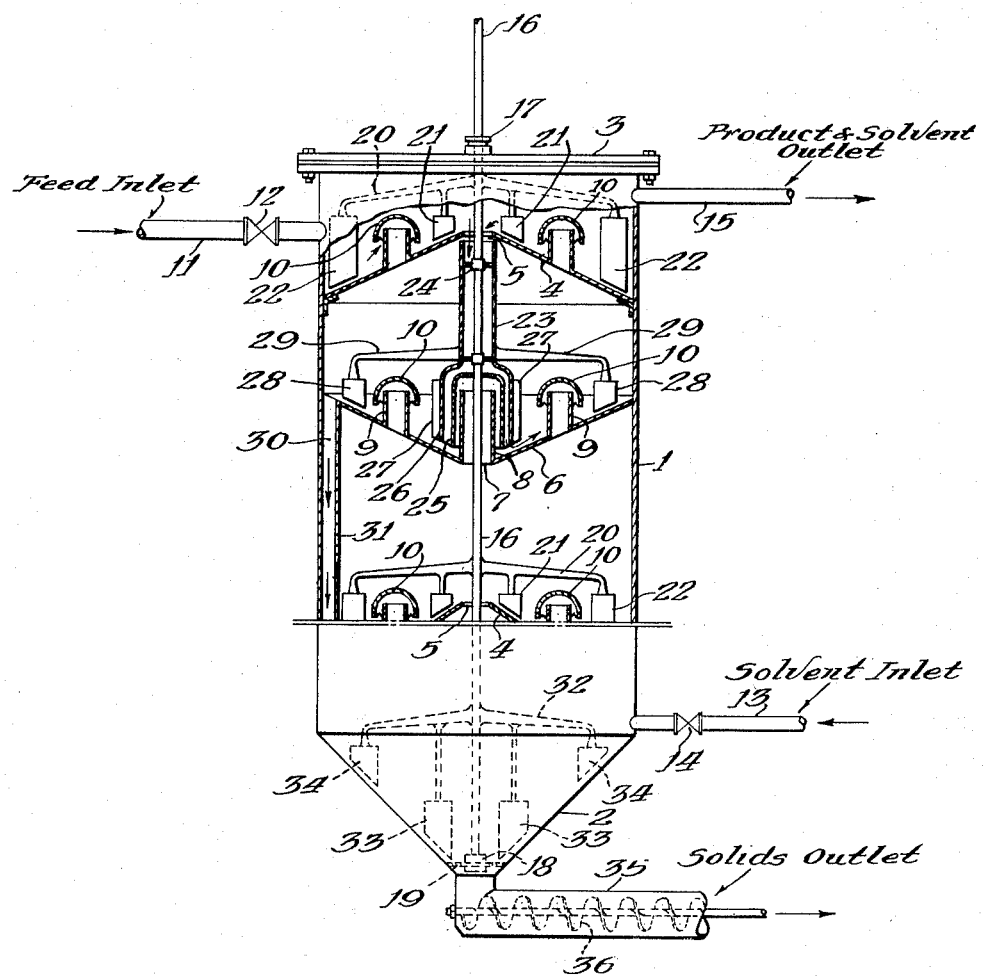
Inventor:
Taliaferro B. Kelly Jr.
By: M. P. Venema
Attorney
Philip T. Liggett
Agent Patented Jan. 2, 1951

2,536,373

UNITED STATES PATENT OFFICE 2,536,373

EXTRACTION COLUMN

Taliferro B. Kelly, Jr., Chicago, Ill., assignor to Universal Oil Products Company, Chicago, Ill., a corporation of Delaware Application July 23, 1949, Serial No. 106,446

5 Claims. (Cl. 23—270)

This invention relates to an improved type of contacting or solvent extraction type of column particularly adapted for contacting a slurry of sub-divided solid material with a suitable fluid medium. For example, the apparatus is especially desirable for effecting a solvent extraction operation in connection with Athabaska tar sands, or other hydrocarbonaceous materials such as torbinite, oil shale, and lignite, which may be crushed and charged to the apparatus in a sub-divided state.

There are, of course, many types of washing, mixing and contacting columns and apparatus, many of which are suitable for solvent extraction operations; however, all are not particularly adapted to the handling of a slurry or solid material in a continuous operation while maintaining a high degree of extraction efficiency. Also, it may be noted that there are various methods or systems for carrying out a solvent extraction operation, such as single contact, multiple contact, concurrent flow, or countercurrent flow, which in turn directly affect the overall efficiency of the unit.

It is a principal object of the present invention to provide a single unitary apparatus which affects both a countercurrent and multiple contacting operation between a slurry stream and a solvent or washing stream.

It is a further object of the invention to provide an extraction column having a construction which insures not only good contacting but the continuous movement of the subdivided solid materials without danger of its clogging or plugging within the unit.

Briefly, the improved apparatus of this invention comprises in combination, a confined vertically disposed chamber having a plurality of superimposed and spaced contacting decks, alternate decks or trays of the plurality of superimposed trays have a conically shaped deck plate with an elevated overflow port at the center portion thereof while the remaining intermediate or other alternately spaced decks of the plurality have an inverted cone-shaped deck plate, each of the contacting decks or trays having a plurality of risers and caps suitable to permit a rising fluid stream to pass therethrough, a rotatable shaft extending axially through said chamber and through each of the contacting decks, with arms and paddles attached to the shaft and extending therefrom above each of the contacting decks, a solids inlet connecting with the upper portion of said chamber above the uppermost deck, and a solids outlet from the lower portion of the chamber, a fluid inlet at the lower end of the chamber and a products stream outlet from the upper portion thereof, downspout means from the outer periphery of the inverted cone-shaped deck plates and additional downspout means along and around the rotatable shaft below each of the decks having the elevated center opening whereby the solids material charged to the chamber is passed alternately to the center portion of one contacting deck and to the outer periphery of the next contacting deck so that a multiple contact and countercurrent flow is maintained between descending solid material and a rising fluid stream.

More specifically, in a preferred embodiment of the contacting apparatus or column, arms and paddles from the rotating shaft are placed to pass each side of centrally positioned bubble caps and risers at each contacting deck, and the lower edge of each of the paddles is made to conform with the slope of the particular deck and thus insure the continuous movement of the solid material at each deck towards its downspout and thereby maintain a continuous movement of the material from the upper portion of the column to the lower end thereof. Also, paddles may be provided in the lower end of the chamber so that solid material after having been contacted a plurality of times is maintained in an agitated state and guided towards the particle outlet whereby to prevent its clogging or packing within the lower portion of the chamber.

In addition to the countercurrent flow through the unit and the multiple contact arrangement, it is a feature of the present invention to have the solid material at each deck agitated and guided by the paddles so that it moves upwardly along a sloping deck plate, to insure its being adequately contacted and/or subjected to adequate washing or solvent extraction with the fluid stream prior to being passed to the next lower deck. The alternate normal and inverted cone-shaped contacting deck plates are of particular advantage in having the solid material pass alternately from the center of the column to the exterior of the column as it descends from contacting deck to contacting deck through the vertically disposed column.

Additional features and advantages of the present apparatus will be more apparent upon reference to the accompanying drawing and the following description thereof.

Referring now to the drawing, there is shown one embodiment of the improved apparatus which provides, for example, a desirable extraction column suitable for effecting the extraction of oleaginous substances from a solid material such as tar sand or the like, with a suitable solvent. The solvent may be a fluid hydrocarbon stream charged into the unit at a suitable temperature and pressure. The vertically disposed housing or chamber 1 has a conical bottom or lower end 2 and a flanged upper end with a suitable removable head or cover 3. The inside of the column or chamber 1 is provided with a plurality of contacting decks which are spaced from one another and superimposed directly above one another as indicated in the drawing. The uppermost tray or deck has a conically shaped deck plate 4 which extends from the inside wall of the chamber 1 upwardly to a center opening or port 5, while the next lower tray has an inverted cone-shaped deck plate, extending downwardly from the inside wall of the chamber to a center opening and passageway 7 formed by a suitable retaining wall 8. Any desired number of contacting decks may be maintained within the column, the rising cone-shaped decks 4 alternating with the inverted cone-shaped decks 6 throughout the height of the column.

Extending upwardly from each of the deck plates 4 and 6 are a plurality of risers 9 and acompanying bubble caps 10. The risers and caps being suitable to permit the upward flow of the fluid medium charged through the column and its downward deflection into contact with the solid material passing across the upper surface of each of the decks. The solid material, such as tar sand in a sub-divided state, is passed to the upper portion of the chamber above the uppermost deck plate by way of line 11 and control valve 12 while a suitable solvent material is passed to the lower portion of the extraction column or contacting column, by way of line 13 having control valve 14. Thus, in operation, the solid material passes from the upper portion of the column downwardly over the successive contacting plates or trays to the lower portion of the chamber countercurrently to a rising fluid medium which passes upwardly through and across each of the contacting decks to ultimately be removed from the column along with a desired product or extracted material. In this embodiment, the product stream is discharged by way of line 15.

A rotatable shaft 16 extends axially throughout the entire length of the column and passes through each of the plurality of contacting decks or trays. The shaft is maintained in alignment by a suitable upper bearing 17 and a suitable lower bearing 18, which in this embodiment is indicated as being within the lower end of the chamber 1. The bearing 17 extends upwardly from the top cover 3, while the bearing 18 may be supported by suitable rib-like or spoke-like members 19 that extend from the inside wall of the lower head 2. The bearing 18 and the supporting rods or spokes 19 are of course constructed and arranged in a manner permitting the passage of solid material and liquid through the lower end of the head 2. The shaft 17 may be driven by a suitable motor mounted directly above the chamber or alternately through suitable gearing or a belt drive, but it is of course not intended to limit the present invention to any particular type or form of driving mechanism.

Above each of the contacting decks 4 and 6, the rotating shaft is provided with suitable arms and paddles, the paddles in each case being constructed to extend to a short distance above the deck plate and insure a continuous agitation and movement of the solid material which passes across each deck plate. In the embodiment shown, suitable arms 20 and plurality of inner paddles 21 and exterior paddles 22 are positioned above each of the cone-shaped deck plates 4, with the lower edge of each of the paddles or blades 21 and 22 being shaped to conform with the slope of the deck plate 4. Similarly, arms and paddles extend from the rotating shaft 16 above each of the alternately positioned trays or deck plates 4. The blades or paddles 21 and 22 may also be placed at an angle with respect to the shaft so that the solid material is caused to flow or move upwardly along the conical surface of the deck plate and spill downwardly through the central opening 5. Around the rotating shaft and below each of the centrally positioned openings 5, is placed a suitable conduit or downspout pipe 23 which is suitable to pass solid material to the next lower deck plate. A downpipe 23 is of course provided below each deck 4 for the entire series of superimposed and alternately placed contacting trays or decks. The downpipes or conduits 23 may be attached to the rotating shaft and turned therewith, with suitable hub and spoke members 24 being utilized inside of the downspout 23 to connect it to the shaft and to cause it to rotate therewith. The lower portion of the downspout is flared into and forms an annular-shaped outlet by means of an inner wall 25 and outer wall 26, the latter being a continuation of the upper portion of the conduit 23, while the inner wall 25 connects to the rotating shaft at a point below the lower hub member 24. A cylindrical or annular-shaped outlet portion is formed in order to extend around the inner retaining wall 8 and the lower center portion of the plurality of alternately placed deck plates 6. In the present construction, suitable inner paddles or blades 27 are placed radially or angularly outward from the exterior wall 26 in order to provide the desired movement of the solid material upwardly along the sloped deck plate 6. A plurality of externally positioned paddles 28 may be supported by suitable arm members 29 and, as noted in connection with the other blades or paddles, they may be placed to aid the upward movement of the solid material along the surface of the deck plate and into one or more suitable downspouts 30 which extend downwardly from the outer periphery of each of the inverted cone-shaped deck plates 6. The downspout 30, may in a simplified embodiment, be formed by a suitable baffle or plate member 31 which extends from and combines with the inside wall of the chamber 1 to form a suitably sized downspout channel.

It is to be noted in connection with my improved contacting chamber, that the solid material charged to the upper portion of the chamber passes in a gravity flow from one deck or contacting tray to the next, but at each of the superimposed trays it is forced mechanically by agitation from the rotating blades to move upwardly along an inclined sloping deck plate or tray to a suitable downspout which carries it to the next lower tray. It is to be further noted, that the solid material is alternately deposited at the center portion of one tray and at the outer periphery of the next tray so that it is traversing the cross-sectional area of the vertically disposed column or chamber 1 as it descends through the column. As the construction provides for the upward movement of the material at each deck or tray, there is insured an adequate contacting time on each tray and there is substantially no chance of any of the material being passed in a rapid or short-circuiting manner from one tray to another without adequately contacting liquid at each of the trays.

It is an additional feature of a preferred embodiment of the apparatus, to maintain a plurality of agitating and guiding blades or paddles within the lower end of the chamber as indicated by the supporting arms 32, inner paddles 33, and outer paddles 34. The latter series of paddles are particularly desirable and useful in maintaining constant agitation of the solid material prior to its being discharged from the chamber and preventing its settling or clogging within the chamber and blocking the continuous flow and a continuously operating unit. The contacted or extracted solid material is continuously discharged through an outlet opening or passageway 35 which in turn may be provided with a mechanical conveyor, feed screw or the like, which insures the positive discharge of all solid material from the unit. A driven feed screw 36 is indicated in the present drawing, and provides one desirable form of mechanical discharging means.

It, of course, is obvious to those familiar with the design of apparatus of this type that minor modifications may be made in the apparatus within the scope of the present invention and that it is not intended to limit its construction and arrangement to the exact diagrammatic drawing which is shown and has been briefly described. For example, it is not intended to limit the apparatus to any set number of paddles or blades at each of the contacting decks, or to any set number of blades within the lower end of the chamber for aiding in the discharge of solid material. Further, it is not intended to limit the apparatus to any set number of superimposed contacting decks, the number will vary with the particular type of contacting or extraction operation and types of materials involved, while still other processing conditions may effect the number of contacts required to effect an efficient operation. Also, while not shown in the drawing, a preferable embodiment of the apparatus has each of the deck plates 4 and 6 connected to the inside wall of the chamber 1 in a removable manner for assembly purposes. Likewise, the rotatable shaft and connecting arms may be provided with construction or assembly joints for purposes of aiding in the assembly of the entire unit.

The unitary apparatus of this invention, as hereabove noted, has been designed and constructed to provide an efficient solvent extraction column such as may be used in connection with tar sands or other hydrocarbonaceous solids, wherein it is desired to obtain oleaginous substances therefrom by a suitable solvent fluid. However, to those who are familiar with processing operations in the chemical and petroleum arts, it is obvious that the same apparatus may be utilized as a reaction chamber, a scrubber, wash chamber, and the like, where it is desired to countercurrently contact a slurry or subdivided solid material in a continuous manner with a suitable fluid stream, thus obtaining an efficient multiple contact and countercurrent flow processing operation.

I claim as my invention:

1. A mixing and contacting column adapted to effect the contact of sub-divided solid particles with a fluid stream, comprising in combination, a confined vertically disposed chamber having a plurality of spaced contacting decks, alternate decks of said plurality of decks having a conically shaped deck plate with a centrally positioned and elevated overflow port, additional intermediate and alternately spaced decks of said plurality having an inverted cone-shaped deck plate, a plurality of risers and bubble caps extending upwardly from each of said deck plates, a rotatable shaft extending axially through said chamber and said decks, arms and paddles extending from said shaft above each of said plurality of contacting decks, said paddles having their lower ends conforming to the slope of the respective deck plate therebelow, whereby solids being passed downwardly through said chamber are forced upwardly at each of the contacting decks prior to being passed downwardly to the next lower deck, a centrally positioned downspout passageway extending along and around said shaft below each of said conical decks having said centrally positioned overflow ports, a retaining wall around said shaft at the center portion of each of said alternate decks having said inverted cone-shaped deck plates, downspout means extending downwardly from the outer periphery of each of said decks having inverted cone-shaped deck plates, a solids inlet at the upper portion of said chamber above the upper of said plurality of decks and a solids outlet from the lower end of said chamber, a fluid inlet connecting with the lower portion of said chamber below the lowermost of said plurality of decks, and a product outlet from the upper portion of said chamber.

2. The mixing apparatus of claim 1 further characterized in that additional mixing paddles and arms extend from the lower portion of said shaft in the lower end of said chamber, whereby to maintain the continuous agitation of said solids prior to their being discharged from the lower end of the chamber.

3. A solvent extraction column adapted to counter-currently contact sub-divided solid material with a suitable solvent, comprising in combination, a confined and vertically disposed chamber having a plurality of superimposed and spaced contacting decks, alternate decks of said plurality of decks having conically shaped deck plates extending upwardly from the inside wall of said chamber and having elevated overflow ports in the center portion thereof, intermediate and alternately placed decks of said plurality of decks having an inverted cone-shaped deck plate, downspout means extending downwardly from the elevated periphery of last said decks along side the inner wall of said chamber, a plurality of risers and accompanying bubble caps extending upwardly from each of said deck plates, a driven and rotatable shaft extending axially through said chamber and said plurality of decks with a plurality of arms and paddles extending from said shaft above each of said contacting decks, said paddles having their lower ends conforming to the slope of the respective conical and inverted cone-shaped deck plates, a retaining wall at the center portion of each of said intermediate decks having the inverted cone-shaped deck plates, said wall extending upwardly to an elevation above the outer periphery of the deck plate, whereby solids are forced to descend through said downspout means along said inner wall of the chamber, a centrally positioned downspout extending along and around said shaft below each of the first mentioned alternate decks having the centrally positioned and elevated overflow ports, said centrally positioned downspouts discharging into the center portion of said inverted cone-shaped deck plates, each of last said downspouts connecting with said rotatable shaft whereby they rotate with the latter, a solids inlet to the upper portion of said chamber at a point above the uppermost of said plurality of contacting decks and a solids outlet from the lower end of said chamber, a solvent inlet in the lower portion of said chamber below the lowermost of said plurality of decks and a product outlet from the upper portion of said chamber, whereby said solvent moves upwardly through said column and through said contacting decks counter-currently to a descending flow of solids material, and additional arms and paddles extending from said rotatable shaft in a lower portion of said chamber below said contacting decks whereby to agitate and move said solids through said outlet.

4. The apparatus of claim 3 further characterized in that each of the contacting trays are removably supported from the inner wall of said chamber, said rotating shaft is removably positioned within said chamber, and said chamber has a removable pressure retaining top head.

5. The apparatus of claim 4 still further characterized in that said risers and caps are spaced in a circular row around the central portion of each of said contacting decks, and said paddles from said rotating shaft are positioned at each deck to rotate in paths passing both sides of said risers and caps.

TALIFERRO B. KELLY, Jr.

No references cited.